United States Patent
Vigna et al.

(10) Patent No.: US 6,527,961 B1
(45) Date of Patent: *Mar. 4, 2003

(54) METHOD OF MANUFACTURING PRESSURE MICROSENSORS

(75) Inventors: Benedetto Vigna, Potenza (IT); Paolo Ferrari, Gallarate (IT); Pietro Montanini, Melegnano (IT); Marco Ferrera, Domodossola (IT)

(73) Assignee: SGS-Thomson Microelectronics, S.r.l.

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,467

(22) Filed: Mar. 2, 1998

(30) Foreign Application Priority Data

Mar. 4, 1997 (EP) .............................. 97830093

(51) Int. Cl.[7] .............................. C23F 1/00; B23P 15/00; C03C 25/00; H01L 21/00; H01G 7/00
(52) U.S. Cl. ................. 216/2; 216/39; 216/99; 438/53; 427/100; 427/255.18; 361/283.4
(58) Field of Search ................. 438/53; 216/2, 216/39, 99; 427/100, 255.1, 255.18, 255.27, 255.37; 361/283.4

(56) References Cited

U.S. PATENT DOCUMENTS

| | | | | |
|---|---|---|---|---|
| 4,406,992 A | * | 9/1983 | Kurtz et al. | 338/2 |
| 4,439,463 A | * | 3/1984 | Miller | 427/39 |
| 4,495,820 A | * | 1/1985 | Shimada et al. | 361/283.4 |
| 4,665,610 A | * | 5/1987 | Barth | 438/53 |
| 4,744,863 A | * | 5/1988 | Guckel et al. | 438/53 |
| 4,849,071 A | * | 7/1989 | Evans et al. | 156/644 |
| 5,095,401 A | | 3/1992 | Zavracky et al. | 361/283 |
| 5,369,544 A | | 11/1994 | Mastrangelo | 361/283.4 |
| 5,510,276 A | * | 4/1996 | Diem et al. | 437/24 |

FOREIGN PATENT DOCUMENTS

| | | | |
|---|---|---|---|
| EP | 0624 900 A2 | | 11/1994 |
| EP | 0727 650 A2 | | 8/1996 |
| EP | 0 822 579 A1 | * | 2/1998 |

OTHER PUBLICATIONS

"Stress in silicon dioxide films deposited using chemical vapor deposition techniques and the effect of annealing on these stresses," *Journal of Vacuum Science & Technology B,* Second Series, vol. 8, No. 5, Sep./Oct. 1990, pp. 1068–1074.

* cited by examiner

*Primary Examiner*—Patrick Ryan
*Assistant Examiner*—Julian Mercado
(74) *Attorney, Agent, or Firm*—Jenkens & Gilchrist, P.C.

(57) ABSTRACT

A method for the formation of a region of silicon dioxide on a substrate of monocrystalline silicon. The epitaxial growth of a silicon layer, the opening of holes in the silicon layer above the silicon dioxide region, and the removal of the silicon dioxide which constitutes the region by means of chemical attack through the holes until a silicon diaphragm, attached to the substrate along the edges and separated therefrom by a space, is produced. In order to form an absolute pressure microsensor, the space has to be sealed. To do this, the method provides for the holes to have diameters smaller than the thickness of the diaphragm and to be closed by the formation of a silicon dioxide layer by vapor-phase deposition at atmospheric pressure.

23 Claims, 2 Drawing Sheets

METHOD OF MANUFACTURING PRESSURE MICROSENSORS

FIELD OF THE INVENTION

The present invention relates to methods of manufacturing semiconductor devices and, more particularly, to a method of manufacturing a pressure microsensor on a silicon substrate.

BACKGROUND OF THE INVENTION

Two techniques are known for producing pressure, acceleration and similar microsensors which include the formation of thin diaphragms on a substrate of semiconductor material. One of these techniques is based on the machining of a wafer of semiconductor material on both of its faces, essentially by means of anisotropic chemical attack (bulk micromachining). The other is based on machining on a single face of a wafer of semiconductor material by the deposition of thin layers and the selective removal of a portion of an inner or buried layer with the use of isotropic chemical attack (surface micromachining). The latter technique is particularly suitable for the integration of the sensor with processing circuits associated therewith.

A method of manufacturing microstructures by the "surface micromachining" technique is the subject of European patent application No. 96830437.8 filed by the Applicant on Jul. 31, 1996, hereby incorporated by reference, and is described briefly below with reference to FIGS. 1–4. This method provides for the formation of a silicon dioxide region 10 on a monocrystalline silicon substrate 11 (FIG. 1), the formation by epitaxial growth of a silicon layer in which polycrystalline silicon 12 grows on the silicon dioxide region 10 and monocrystalline silicon 13 grows on the rest of the substrate (FIG. 2), the formation of holes 14 in the polycrystalline portion of the silicon layer (FIG. 3), and the removal of the silicon dioxide region 10 by chemical attack with hydrofluoric acid through the holes 14 (FIG. 4) so as to form a space 15 beneath a diaphragm of polycrystalline silicon 12'.

SUMMARY OF THE INVENTION

The object of the present invention is to produce an absolute pressure sensor with the use of the "surface micromachining" technique. This requires the formation of a structure similar to that obtainable by the known method described above, but in which the space defined by the polycrystalline silicon diaphragm is closed hermetically.

Accordingly, the present invention provides a method of manufacturing a pressure microsensor on a silicon substrate. The method comprises the steps of forming a region of a selectively removable material on the substrate, forming a silicon layer on this region and on the substrate, forming holes in the silicon layer above the region, removing the material from the region by selective chemical attack through the holes until a diaphragm of predetermined thickness constituted substantially by a portion of the aforesaid silicon layer, attached to the substrate along the edges and separated therefrom by a space, is produced, and forming means for detecting mechanical deformation of the diaphragm. The holes have widths smaller than the thickness of the diaphragm, and after the diaphragm has been produced, a layer of silicon dioxide which closes the holes is formed by vapor-phase deposition at atmospheric pressure on the portion of the silicon layer which constitutes the diaphragm.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

BRIEF DESCRIPTION OF THE DRAWINGS

The invention will be understood better from the following detailed description of a preferred embodiment thereof, given by way of non-limiting example with reference to the appended drawings, in which.

DETAILED DESCRIPTION OF A PREFERRED EMBODIMENT OF THE INVENTION

Figure 1:
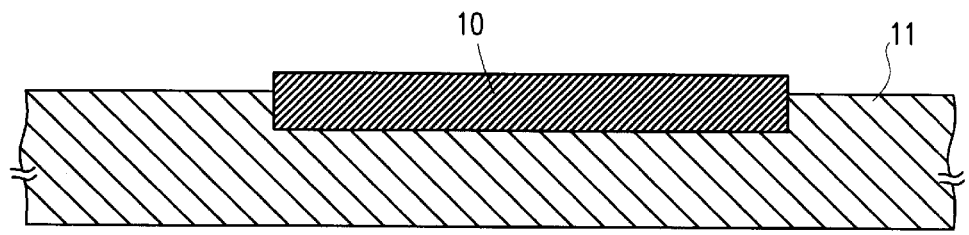
FIGS. 1–4 show, in section, a portion of a silicon wafer in successive stages of processing in accordance with the prior art.
Figure 2:
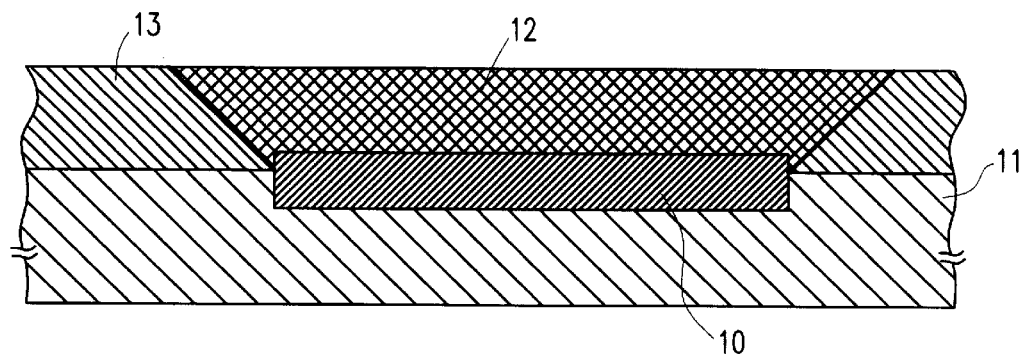
Figure 3:
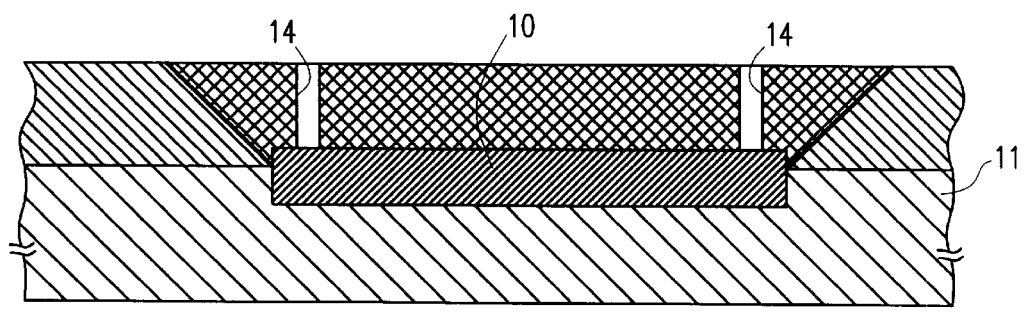
Figure 4:
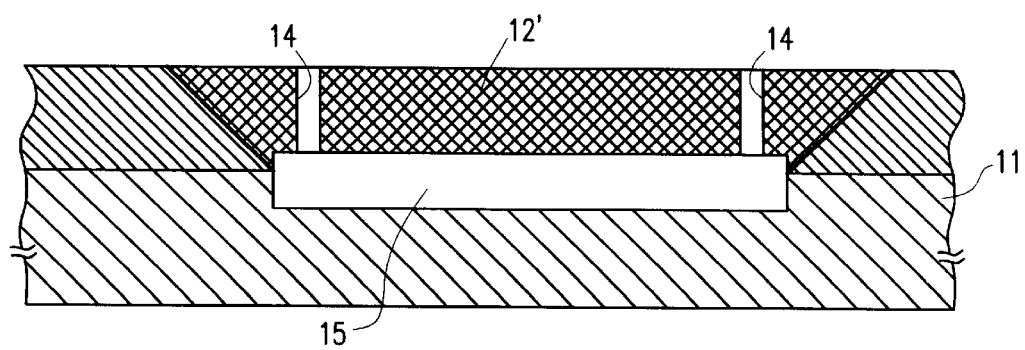
Figure 5:
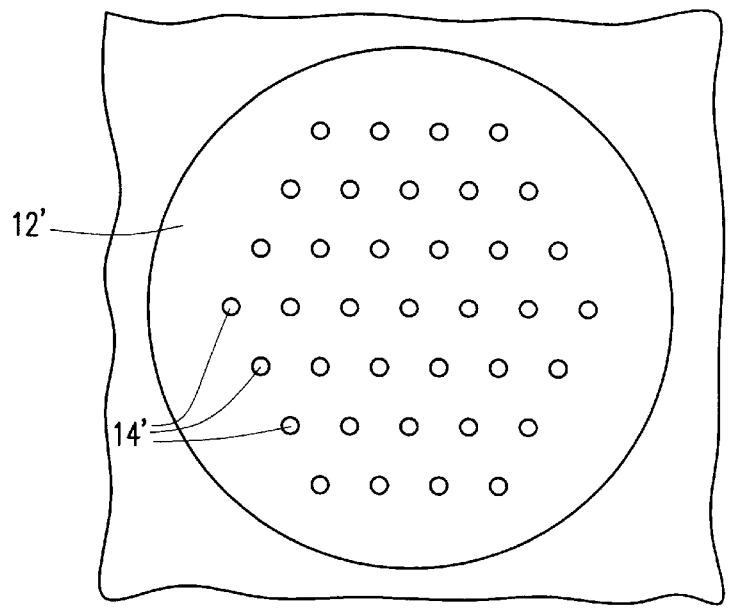
FIG. 5 is a plan view of a portion of a silicon wafer having a structure similar to that shown in section in FIG. 4 and formed in accordance with the present invention.

According to the invention, the method is carried out in the manner described in the European patent application cited above, as far as the removal of the buried silicon dioxide region, that is, until a structure similar to that shown in FIG. 4, with a polycrystalline silicon diaphragm 12' attached to the silicon substrate 11 along its edges, separated therefrom by a space and perforated at several points, is obtained. In a preferred embodiment, the diaphragm 12' is circular and has a plurality of circular holes 14' distributed uniformly about its surface, as shown in FIG. 5. The number of holes is selected so as to ensure complete removal of the oxide, but without appreciable alteration of the mechanical characteristics of the diaphragm, with a relatively short attack time of, for example, from 5 to 10 minutes. In the embodiment described, the thickness of the diaphragm 12' is about 10 $\mu$m and the thickness of the silicon dioxide region removed, and hence of the space 15, is abut 2 $\mu$m. According to the invention, the widths of the holes for the attack of the oxide beneath the diaphragm 12' should be smaller than the thickness of the diaphragm. In this example, this width, that is, the diameter of each hole 14', is about 2 $\mu$m.

Figure 6:
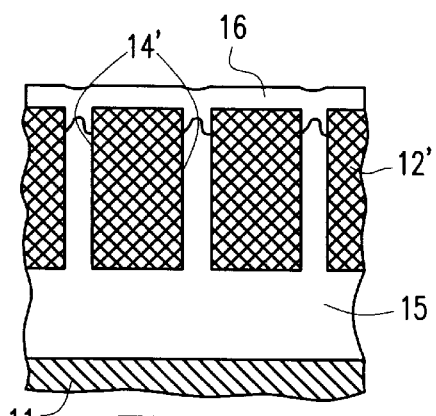
FIG. 6 shows, in section and on an enlarged scale, a detail of the structure of FIG. 5 at a subsequent processing stage.

The next step of the method according to the invention is the formation of a layer 16 of silicon dioxide on the polycrystalline silicon of the diaphragm, as shown in FIG. 6. This layer is produced by vapor-phase deposition (CVD) at atmospheric pressure with the use of a mixture of silane and oxygen in proportions of 1 to 10, possibly also containing doping compounds such as diborane or phosphine, at a temperature of between 350 and 450° C., preferably 380° C., and for a period of about 2 minutes.

In these conditions, and with the hole diameter indicated above, the silicon dioxide is formed on the surface of the diaphragm and, naturally, on that of the surrounding monocrystalline silicon, but does not form or forms only to a negligible extent, inside the space. In practice, the reagents accumulate at the mouths of the holes 14', forming a layer of silicon dioxide which gradually reduces the widths of the holes, until it closes them completely, thus sealing the space. It is thought that this result is due to the fact that, in the operative conditions indicated, the reagents are not absorbed by the silicon surfaces and their mean free path is much greater than the diameters of the holes.

In addition to circular holes, elongate, that is slot-shaped or rectangular, holes with widths of about 2 μm have been tested. Naturally, holes of any other shape may be used with the same results, provided that the width satisfies the condition indicated above.

In the preferred embodiment of the method according to the invention, air at atmospheric pressure remains inside the space 15. However, in different processing conditions, another gas may remain at atmospheric pressure inside the space without this affecting the characteristics of the resulting microsensor.

The method continues with a photolithography step to remove the layer of silicon dioxide, except from the area of the diaphragm, by standard operations for the formation of other electronic components on the same substrate. For example, a layer of silicon nitride may be deposited and then removed selectively to form the active areas of a MOS integrated circuit in the epitaxial monocrystalline silicon layer.

Figure 7:
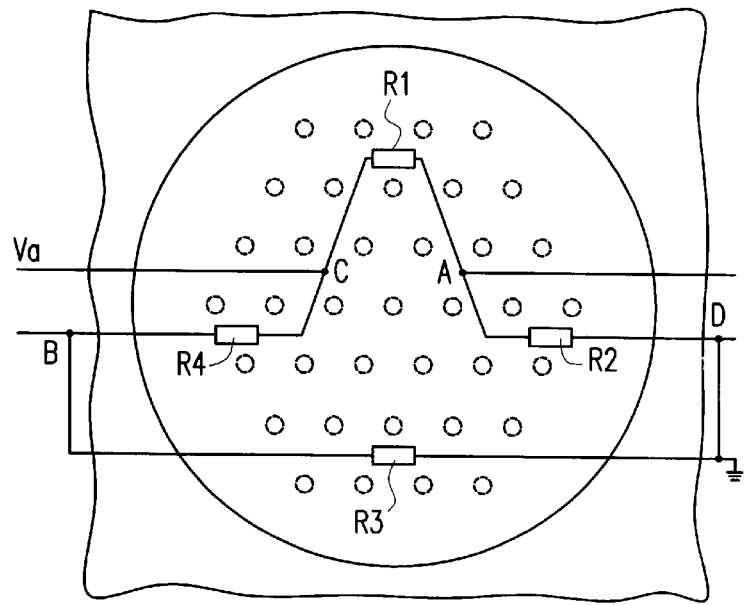
FIG. 7 shows, in plan and schematically, an absolute pressure microsensor produced by the method of the present invention.

In order to complete the formation of the sensor, means, for example, piezoresistive elements, are required for detecting mechanical deformation of the diaphragm 12'. According to a preferred embodiment, particularly when the sensor is to operate at high temperature, a layer of doped polycrystalline silicon is deposited on the nitride covering the diaphragm and is then defined by normal photolithographic processes so as to produce four identical, elongate doped regions with the function of piezoresistors R1–R4 on edge regions of the diaphragm 12', as shown schematically in FIG. 7. Electrical connections are then formed in order to form a Wheatstone bridge, as shown in the drawing. Two resistors R2 and R4 of the bridge are oriented radially so that, when the diaphragm is acted on by a positive pressure, their resistance increases owing to the piezoresistive effect, and the other two resistors, R1 and R3 are oriented tangentially so that their resistance decreases with the same stress. The pressure is therefore detected as an unbalance of the bridge, that is, as an electrical voltage between two points A and B of the bridge when the other two points C and D are connected to a voltage supply Va.

Alternatively, the resistors may be formed directly on the diaphragm 12' by local doping of the polycrystalline silicon of which it is formed. In this case, the doping is preferably carried out before the operations to close the holes 14'.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

We claim:

1. A method of manufacturing an integrated circuit on a silicon substrate including a pressure microsensor, comprising the following steps:

forming a region comprising a selectively removable material on a surface of the silicon substrate, a surface of the region being sized relative to the surface of the silicon substrate so that transistor integrated circuitry may be formed over the surface of the silicon substrate not covered by the selectively removable material;

forming a silicon layer on the region and on the substrate wherein the silicon layer is an epitaxial growth such that a monocrystalline silicon grows from the surface of the silicon substrate not covered by the selectively removable material and a polycrystalline silicon grows on the region, the monocrystalline silicon being dimensioned for the transistor integrated circuitry to be formed therein;

forming holes in the silicon layer above the region;

removing the selectively removable material from the region by applying a chemical composition through the holes until a diaphragm of the pressure microsensor having a predetermined thickness is defined at least substantially by the polycrystalline silicon on the region, said diaphragm being attached to the silicon substrate along edges of said polycrystalline silicon and separated therefrom by the region;

forming a dielectric layer over the polycrystalline silicon and the holes therein so as to seal the holes;

forming electrical devices for detecting mechanical deformation of the diaphragm; and wherein the holes have widths smaller than the thickness of the diaphragm.

2. The method according to claim 1, wherein the holes are distributed substantially uniformly on the portion of the silicon layer which is to constitute the diaphragm.

3. The method according to claim 1, wherein the diaphragm contains air at atmospheric pressure.

4. The method according to claim 1, wherein the holes are circular.

5. The method according to claim 1, wherein the holes are substantially rectangular.

6. The method according to claim 1, wherein the thickness of the diaphragm is about 10 μm and the widths of the holes are about 2 μm.

7. The method according to claim 1, wherein the selectively removable material is silicon dioxide and the chemical composition for removal of the removable material is hydrofluoric acid.

8. The method according to claim 1, wherein four elongate, doped regions with the function of piezoresistors, and respective electrical connections, are formed on the diaphragm during the step of forming electrical devices to form a Wheatstone bridge, the orientation of the elongate, doped regions being such that a pressure on the diaphragm causes an electrical unbalance of the bridge.

9. The method of claim 1, further comprising the step of:

forming the transistor integrated circuitry in the monocrystalline silicon over the silicon substrate.

10. The method of claim 1, wherein:

the step of forming the dielectric layer is carried out at approximately atmospheric pressure.

11. A method of manufacturing an integrated circuit having a microsensor on a silicon substrate, said method comprising the steps of:

forming a selectively removable region of material on said silicon substrate;

forming an epitaxial growth layer from a surface of said selectively removable region of material and from a surface of said silicon substrate not covered by said selectively removable region of material, said epitaxial growth layer being a monocrystalline silicon growth over said substrate not covered by said selectively removable region of material and a polycrystalline silicon growth over said selectively removable region of material, the monocrystalline silicon growth being dimensioned for forming integrated transistor circuitry therein;

forming holes through said polycrystalline silicon growth over said selectively removable region of material;

removing said selectively removable region of material by the application of at least one chemical through said holes to form a diaphragm of the microsensor having a predetermined thickness, said diaphragm substantially comprising said polycrystalline silicon growth; and sealing the holes with a dielectric material.

12. The method of claim 11, further comprising the step of creating circuitry for detecting mechanical deformation of said diaphragm on said epitaxial growth layer.

13. The method of claim 12, wherein said circuitry for detecting mechanical deformation of said diaphragm comprises at least one piezoresistor.

14. The method of claim 11, wherein said holes have a width that is less than a thickness of said diaphragm.

15. The method of claim 11, further comprising the step of:

forming the integrated transistor circuitry in the monocrystalline silicon growth.

16. The method of claim 11, wherein:

the diaphragm is approximately 10 $\mu$m and a width of the holes is approximately 2 $\mu$m.

17. The method of claim 11, wherein:

the step of the sealing is carried out at approximately atmospheric pressure.

18. A method of manufacturing an integrated circuit including a pressure microsensor on a silicon substrate, comprising the steps of:

forming a region of selectively removable material on the silicon substrate so as to define a first substrate portion having an exposed surface and a second substrate portion over which the region of selectively removable material is formed;

forming an epitaxial growth silicon layer from the exposed surface of the first substrate portion and the region of selectively removable material, the epitaxial growth silicon layer comprising a monocrystalline silicon layer over the exposed surface of the first substrate portion and a polycrystalline silicon layer over the region of selectively removable material;

defining holes in the polycrystalline silicon layer over the region of selectively removable material;

applying a composition in the holes so as to remove the region of selectively removable material and thereby define a diaphragm of the pressure microsensor comprising the, polycrystalline silicon layer over the region from which the selectively removable material was removed;

forming a dielectric layer over the diaphragm so as to close the holes;

forming one or more integrated circuit components in the monocrystalline silicon layer; and forming a device in proximity to the diaphragm for detecting mechanical deformation thereof.

19. The method of claim 18, wherein:

the step of forming integrated circuit components comprises forming transistor integrated circuitry in the monocrystalline silicon layer.

20. The method of claim 18, wherein:

the step of forming a dielectric layer comprises forming a layer of silicon dioxide over the diaphragm.

21. The method of claim 18, wherein:

the step of defining holes comprises the step of defining holes having widths that are smaller than a thickness of the region of selectively removable material.

22. The method of claim 18, wherein:

the diaphragm is approximately 10 $\mu$m and a width of the holes is approximately 2 $\mu$m.

23. The method of claim 18, wherein:

the step of forming a dielectric layer is carried out at approximately atmospheric pressure.

* * * * *

UNITED STATES PATENT AND TRADEMARK OFFICE
CERTIFICATE OF CORRECTION

PATENT NO.      : 6,527,961 B1
DATED           : March 4, 2003
INVENTOR(S)     : Benedetto Vigna et al.

It is certified that error appears in the above-identified patent and that said Letters Patent is hereby corrected as shown below:

<u>Column 3,</u>
Line 6, replace "holes. until" with -- holes until --

Signed and Sealed this

Twenty-second Day of July, 2003

JAMES E. ROGAN
*Director of the United States Patent and Trademark Office*